(12) United States Patent
Kendall

(10) Patent No.: US 11,358,528 B2
(45) Date of Patent: Jun. 14, 2022

(54) VEHICULAR REARVIEW MIRROR ASSEMBLY WITH SPRING-LOADED ELECTRICAL CONNECTOR

(71) Applicant: MAGNA MIRRORS OF AMERICA, INC., Holland, MI (US)

(72) Inventor: Craig Kendall, Grand Haven, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 355 days.

(21) Appl. No.: 16/734,504

(22) Filed: Jan. 6, 2020

(65) Prior Publication Data

US 2020/0148119 A1    May 14, 2020

Related U.S. Application Data

(63) Continuation of application No. 15/878,733, filed on Jan. 24, 2018, now Pat. No. 10,525,889, which is a continuation of application No. 15/051,824, filed on Feb. 24, 2016, now Pat. No. 9,878,669.

(60) Provisional application No. 62/198,881, filed on Jul. 30, 2015, provisional application No. 62/169,705, filed on Jun. 2, 2015.

(51) Int. Cl.
*B60R 1/08* (2006.01)
*B60R 1/04* (2006.01)

(52) U.S. Cl.
CPC .............. *B60R 1/088* (2013.01); *B60R 1/04* (2013.01)

(58) Field of Classification Search
CPC .................................. B60R 1/088; B60R 1/04

USPC ................ 359/237, 238, 240, 245, 265, 267
See application file for complete search history.

(56) References Cited

U.S. PATENT DOCUMENTS

| | | | |
|---|---|---|---|
| 4,712,879 | A | 12/1987 | Lynam et al. |
| 4,882,466 | A | 11/1989 | Friel |
| 5,066,112 | A | 11/1991 | Lynam et al. |
| 5,073,012 | A | 12/1991 | Lynam |
| 5,076,673 | A | 12/1991 | Lynam et al. |
| 5,115,346 | A | 5/1992 | Lynam |
| 5,140,455 | A | 8/1992 | Varaprasad et al. |
| 5,142,407 | A | 8/1992 | Varaprasad et al. |
| 5,151,816 | A | 9/1992 | Varaprasad et al. |
| 5,253,109 | A | 10/1993 | O'Farrell et al. |
| 5,406,414 | A | 4/1995 | O'Farrell et al. |
| 5,525,264 | A | 6/1996 | Cronin et al. |
| 5,567,360 | A | 10/1996 | Varaprasad et al. |

(Continued)

*Primary Examiner* — Tuyen Tra
(74) *Attorney, Agent, or Firm* — Honigman LLP

(57) ABSTRACT

A vehicular rearview mirror assembly includes an electro-optic reflective element and a back plate, with a spring-loaded electrical connector disposed in a passageway of the back plate. The spring-loaded electrical connector is spring-biased toward an extended state and compressible toward a compressed state. The reflective element has an electrically conductive element established at the rear surface and in electrical connection with a conductive coating of the reflective element. A circuit element is disposed at the back plate and has an electrically conductive trace electrically connected to control circuitry. With the back plate attached at the reflective element and with the circuit element attached at the back plate, the spring-loaded electrical connector is compressed toward the compressed state and electrically connects the electrically conductive trace at the circuit element and the electrically conductive element at the reflective element.

30 Claims, 8 Drawing Sheets

(56) References Cited

U.S. PATENT DOCUMENTS

| | | | |
|---|---|---|---|
| 5,610,756 | A | 3/1997 | Lynam et al. |
| 5,668,663 | A | 9/1997 | Varaprasad et al. |
| 5,724,187 | A | 3/1998 | Varaprasad et al. |
| 5,798,688 | A | 8/1998 | Schofield |
| 5,910,854 | A | 6/1999 | Varaprasad et al. |
| 6,002,511 | A | 12/1999 | Varaprasad et al. |
| 6,154,306 | A | 11/2000 | Varaprasad et al. |
| 6,178,034 | B1 | 1/2001 | Allemand et al. |
| 6,329,925 | B1 | 12/2001 | Skiver et al. |
| 6,690,268 | B2 | 2/2004 | Schofield et al. |
| 7,184,190 | B2 | 2/2007 | McCabe et al. |
| 7,195,381 | B2 | 3/2007 | Lynam et al. |
| 7,249,860 | B2 | 7/2007 | Kulas et al. |
| 7,255,451 | B2 | 8/2007 | McCabe et al. |
| 7,274,501 | B2 | 9/2007 | McCabe et al. |
| 7,360,932 | B2 | 4/2008 | Uken et al. |
| 7,400,435 | B2 | 7/2008 | Byers et al. |
| 7,626,749 | B2 | 12/2009 | Baur et al. |
| 7,855,755 | B2 | 12/2010 | Weller et al. |
| 8,058,977 | B2 | 11/2011 | Lynam |
| 8,503,061 | B2 | 8/2013 | Uken et al. |
| 8,743,203 | B2 * | 6/2014 | Karner .................. B60Q 9/00 348/148 |
| 9,025,490 | B2 | 5/2015 | Davari et al. |
| 9,233,641 | B2 | 1/2016 | Sesti et al. |
| 9,487,144 | B2 | 11/2016 | Blank et al. |
| 9,878,669 | B2 | 1/2018 | Kendall |
| 10,525,889 | B2 | 1/2020 | Kendall |
| 2006/0061008 | A1 | 3/2006 | Karner et al. |
| 2010/0085653 | A1 | 4/2010 | Uken et al. |
| 2013/0088884 | A1 | 4/2013 | Brummel et al. |
| 2016/0268716 | A1 | 9/2016 | Conger et al. |
| 2017/0162965 | A1 | 6/2017 | Hallack et al. |

\* cited by examiner

VEHICULAR REARVIEW MIRROR ASSEMBLY WITH SPRING-LOADED ELECTRICAL CONNECTOR

CROSS REFERENCE TO RELATED APPLICATIONS

The present application is a continuation of U.S. patent application Ser. No. 15/878,733, filed Jan. 24, 2018, now U.S. Pat. No. 10,525,889, which is a continuation of U.S. patent application Ser. No. 15/051,824, filed Feb. 24, 2016, now U.S. Pat. No. 9,878,669, which claims the filing benefits of U.S. provisional applications, Ser. No. 62/198,881, filed Jul. 30, 2015, Ser. No. 62/169,705, filed Jun. 2, 2015, and Ser. No. 62/120,039, filed Feb. 24, 2015, which are hereby incorporated herein by reference in their entireties.

FIELD OF THE INVENTION

The present invention relates generally to the field of interior rearview mirror assemblies for vehicles and, more particularly, to interior rearview mirror assemblies having a variable reflectance reflective element and circuitry for electrically connecting to the electrically conductive coatings of the variable reflectance reflective element.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The reflective element may be an electrochromic reflective element having an electrochromic medium sandwiched between front and rear substrates coated with electrically conductive coatings, whereby, when powered, the transmissivity of the reflective element is varied. Typically, electrical connection to the conductive coatings is provided via soldering to clips that clip onto an edge portion of the respective substrate.

SUMMARY OF THE INVENTION

The present invention provides a rearview mirror assembly that provides spring-loaded electrical connectors that electrically connect between circuitry on a circuit element (such as a printed circuit board or the like) and electrically conductive elements established at the rear of the reflective element (such as at the fourth or rear surface of an electro-optic mirror reflective element). The electrically conductive elements may comprise electrically conductive traces that are electrically conductively connected to electrically powered elements at the reflective element, such as the electrically conductive coatings at the second and third surfaces of an electro-optic mirror reflective element. The spring-loaded electrical connectors are urged or biased into electrical contact with the electrically conductive traces and electrically conductive elements as the back plate is attached at the rear of the reflective element and/or as the circuit board or element is attached at the back plate.

These and other objects, advantages, purposes and features of the present invention will become apparent upon review of the following specification in conjunction with the drawings.

DESCRIPTION OF THE PREFERRED EMBODIMENTS

Figure 1:
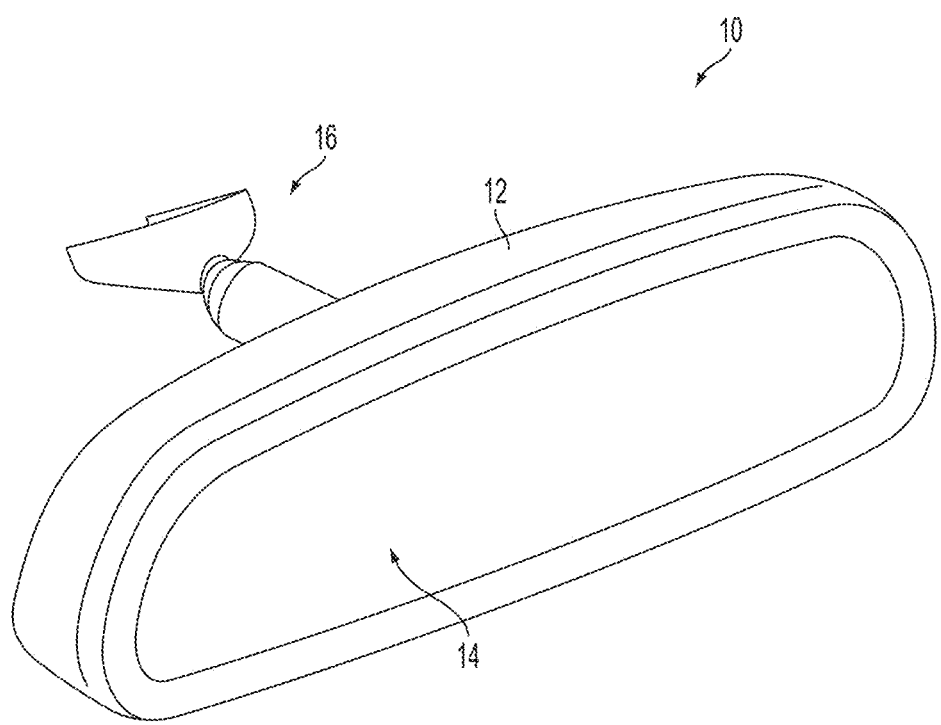
FIG. 1 is a perspective view of an interior rearview mirror assembly in accordance with the present invention.

Referring now to the drawings and the illustrative embodiments depicted therein, an interior rearview mirror assembly 10 for a vehicle includes a casing 12 and a reflective element 14 positioned at a front portion of the casing 12 (FIG. 1). In the illustrated embodiment, mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 16. The mirror reflective element comprises a variable reflectance mirror reflective element that varies its reflectance responsive to electrical current applied to conductive coatings or layers of the reflective element. The reflective element 14 is attached at a back plate 30 and, when a circuit element or circuit board 32 is attached at the back plate, spring-loaded or spring-biased connectors 34 make electrical connection between circuitry on the circuit element 32 and respective electrically conductive coatings or elements at the rear of the mirror reflective element 14, as discussed below.

Figure 2:
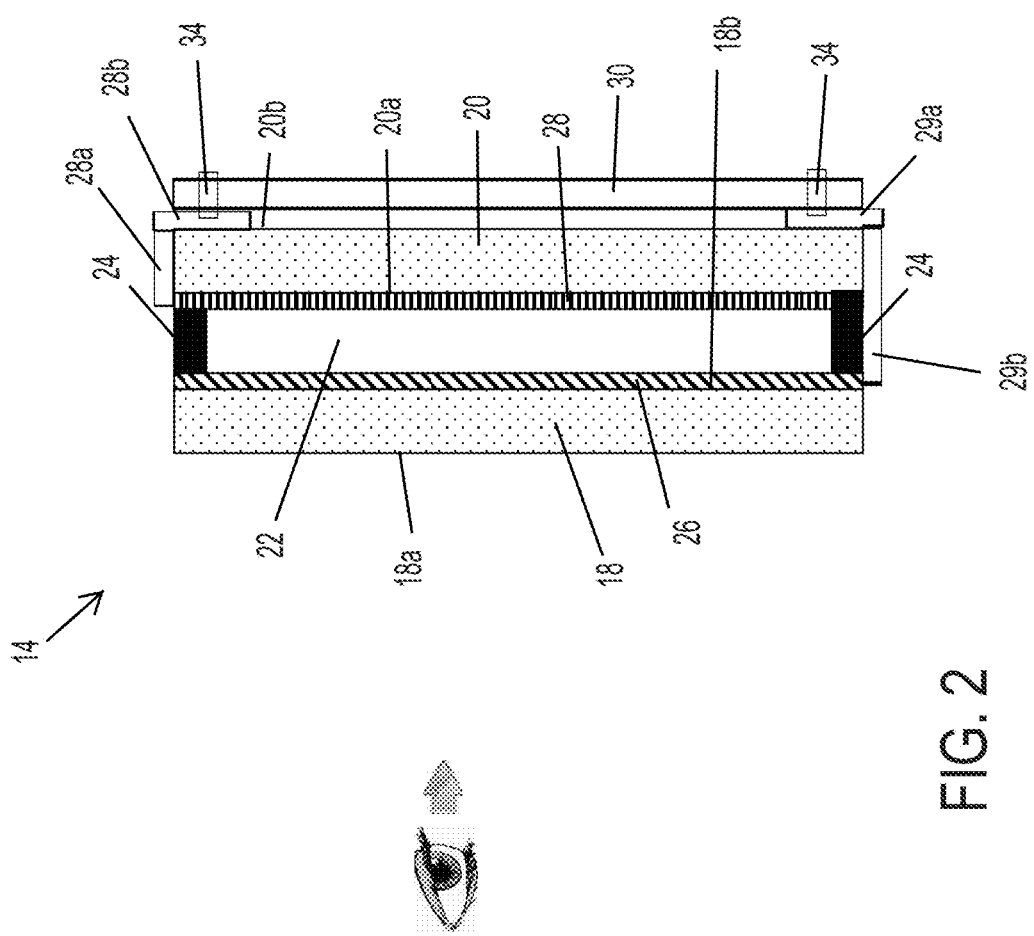
FIG. 2 is a sectional view of the mirror reflective element assembly of the mirror assembly of FIG. 1.

In the illustrated embodiment, and as shown in FIG. 2, the mirror reflective element 14 comprises a laminate construction variable reflectance electro-optic (such as electrochromic) reflective element assembly having a front substrate 18 and a rear substrate 20 with an electro-optic medium 22 (such as electrochromic medium) sandwiched therebetween and bounded by a perimeter seal 24. As shown in FIG. 2, front substrate 18 has a front or first surface 18a (the surface that generally faces the driver of a vehicle when the mirror assembly is normally mounted at the vehicle) and a rear or second surface 18b opposite the front surface 18a, and rear substrate 20 has a front or third surface 20a and a rear or fourth surface 20b opposite the front surface 20a, with the electro-optic medium 22 disposed between the second surface 18b and the third surface 20a and bounded by the perimeter seal 24 of the reflective element (such as is known in the electrochromic mirror art). The second surface 18a has a transparent conductive coating 26 established thereat (such as an indium tin oxide (ITO) layer, or a doped tin oxide layer or any other transparent electrically semi-conductive layer or coating or the like (such as indium cerium oxide (ICO), indium tungsten oxide (IWO), or indium oxide (IO)

layers or the like or a zinc oxide layer or coating, or a zinc oxide coating or the like doped with aluminum or other metallic materials, such as silver or gold or the like, or other oxides doped with a suitable metallic material or the like, or such as disclosed in U.S. Pat. No. 7,274,501, which is hereby incorporated herein by reference in its entirety), while the third surface 20a has a metallic reflector coating 28 (or multiple layers or coatings) established thereat. The front or third surface 20a of rear substrate 20 may include one or more transparent semi-conductive layers (such as an ITO layer or the like), and one or more metallic electrically conductive layers (such as a layer of silver, aluminum, chromium or the like or an alloy thereof), and may include multiple layers such as disclosed in U.S. Pat. Nos. 7,274, 501; 7,184,190 and/or 7,255,451, which are hereby incorporated herein by reference in their entireties. The mirror reflector may comprise any suitable coatings or layers, such as a transflective coating or layer, such as described in U.S. Pat. Nos. 7,626,749; 7,274,501; 7,255,451; 7,195,381; 7,184,190; 6,690,268; 5,140,455; 5,151,816; 6,178,034; 6,154,306; 6,002,511; 5,567,360; 5,525,264; 5,610,756; 5,406,414; 5,253,109; 5,076,673; 5,073,012; 5,115,346; 5,724,187; 5,668,663; 5,910,854; 5,142,407 and/or 4,712, 879, which are hereby incorporated herein by reference in their entireties, disposed at the front surface of the rear substrate (commonly referred to as the third surface of the reflective element) and opposing the electro-optic medium, such as an electrochromic medium disposed between the front and rear substrates and bounded by the perimeter seal (but optionally, the mirror reflector could be disposed at the rear surface of the rear substrate (commonly referred to as the fourth surface of the reflective element), while remaining within the spirit and scope of the present invention).

The third surface 20a defines the active EC area or surface of the rear substrate within the perimeter seal 24. The coated third surface 20a may also be coated to define a tab-out region and wrap around coating or portion 28a (such as by utilizing aspects of the mirror assemblies described in U.S. Pat. Nos. 7,274,501; 7,184,190 and/or 7,255,451, which are hereby incorporated herein by reference in their entireties) that wraps around the perimeter edge of the rear substrate and overcoats a portion of the rear or fourth surface 20b of the rear substrate. The wrap around portion 28a thus provides electrical connection of the conductive layers 28 to an electrically conductive pad or bus-bar or element 28b established or disposed at the rear surface of the rear substrate for electrical connection to a spring-loaded connector 34. Optionally, the conductive pad 28b may comprise a conductive metal pad or element or tab that is adhered or otherwise established at the fourth surface and that is electrically conductively connected to the third surface coating 28 via a conductive epoxy or the like.

Likewise, an electrically conductive pad or bus-bar or element 29a (which may be a coating established at the rear surface of the rear substrate or may be a metal pad or electrically conductive element adhered or otherwise attached or bonded or established or disposed at the rear surface of the rear substrate) may be established at another region of the rear surface of the rear substrate for electrical connection to another spring-loaded connector 34. The conductive pad 29a may be electrically connected to the electrically conductive transparent coating 26 at the rear or second surface 18b of the front substrate 18, such as via a conductive epoxy 29b or the like established along a portion of a perimeter region of the reflective element (and at a region where the perimeter seal 24 may electrically isolate the coating 28 at the rear surface of the rear substrate from the conductive epoxy 29b, such as can be seen in FIG. 2).

Figure 3:
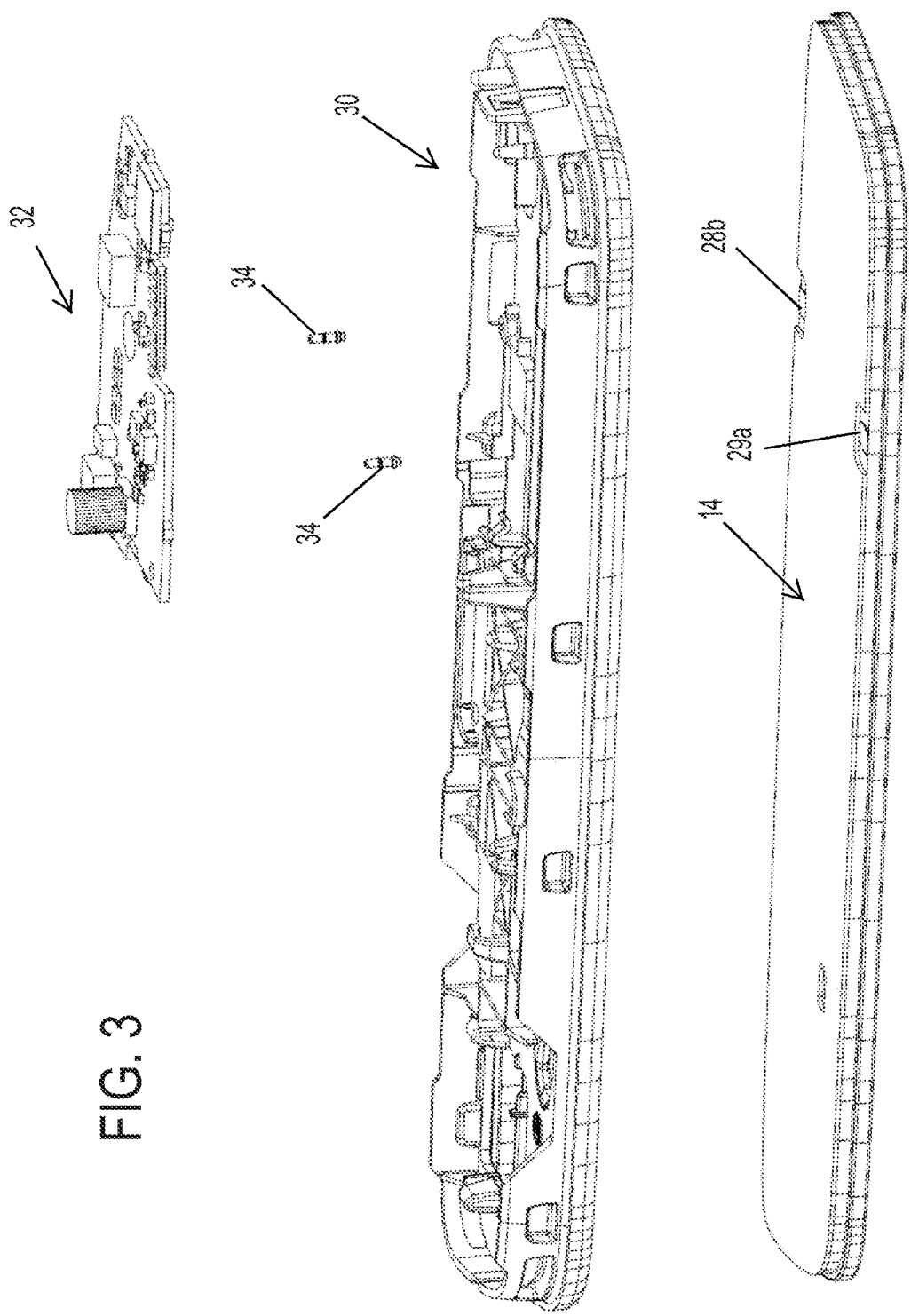
FIG. 3 is an exploded perspective view of the mirror reflective element assembly of the present invention.
Figure 4:
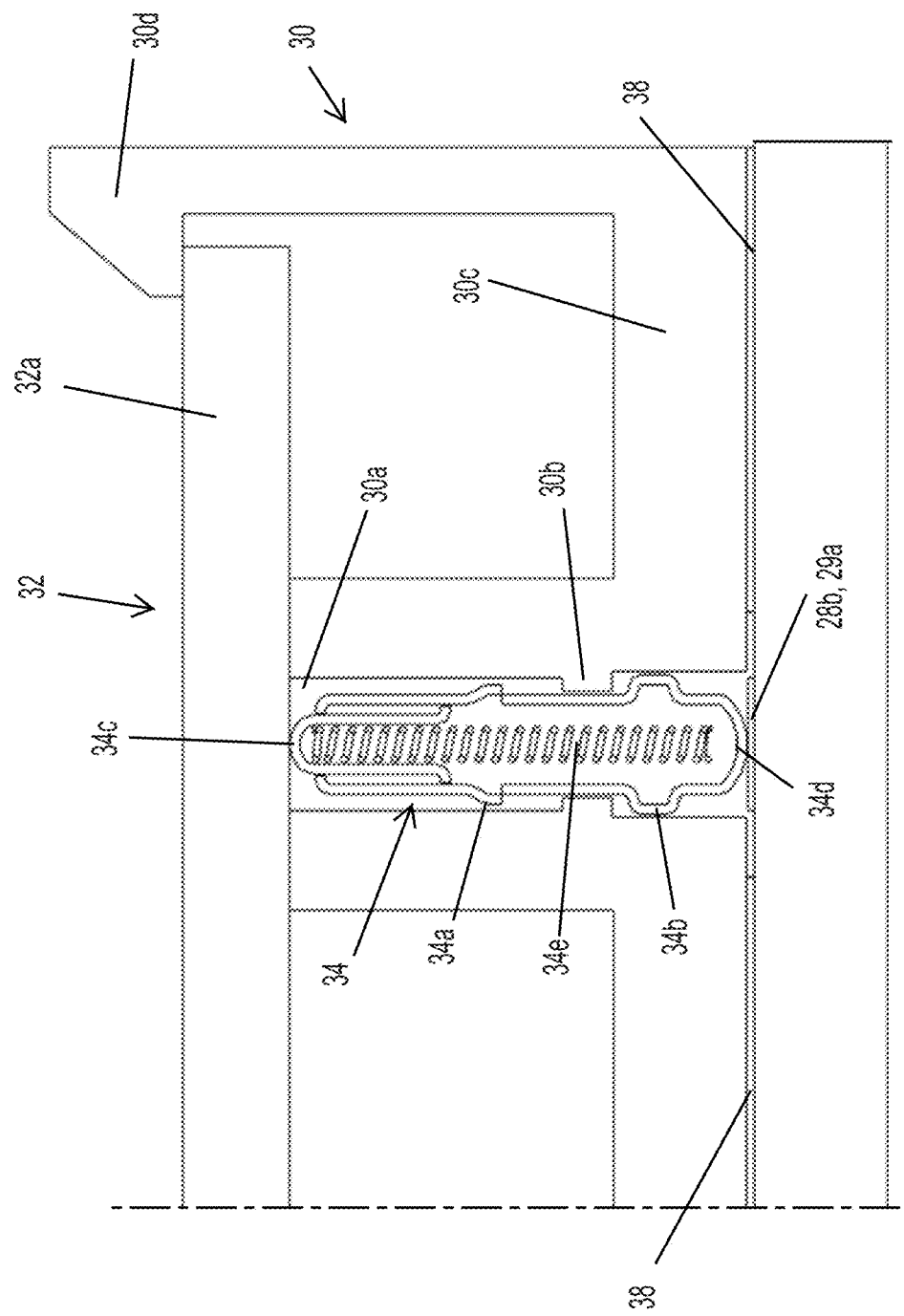
FIG. 4 is an enlarged sectional view of the mirror reflective element assembly of FIG. 3.
Figure 5:
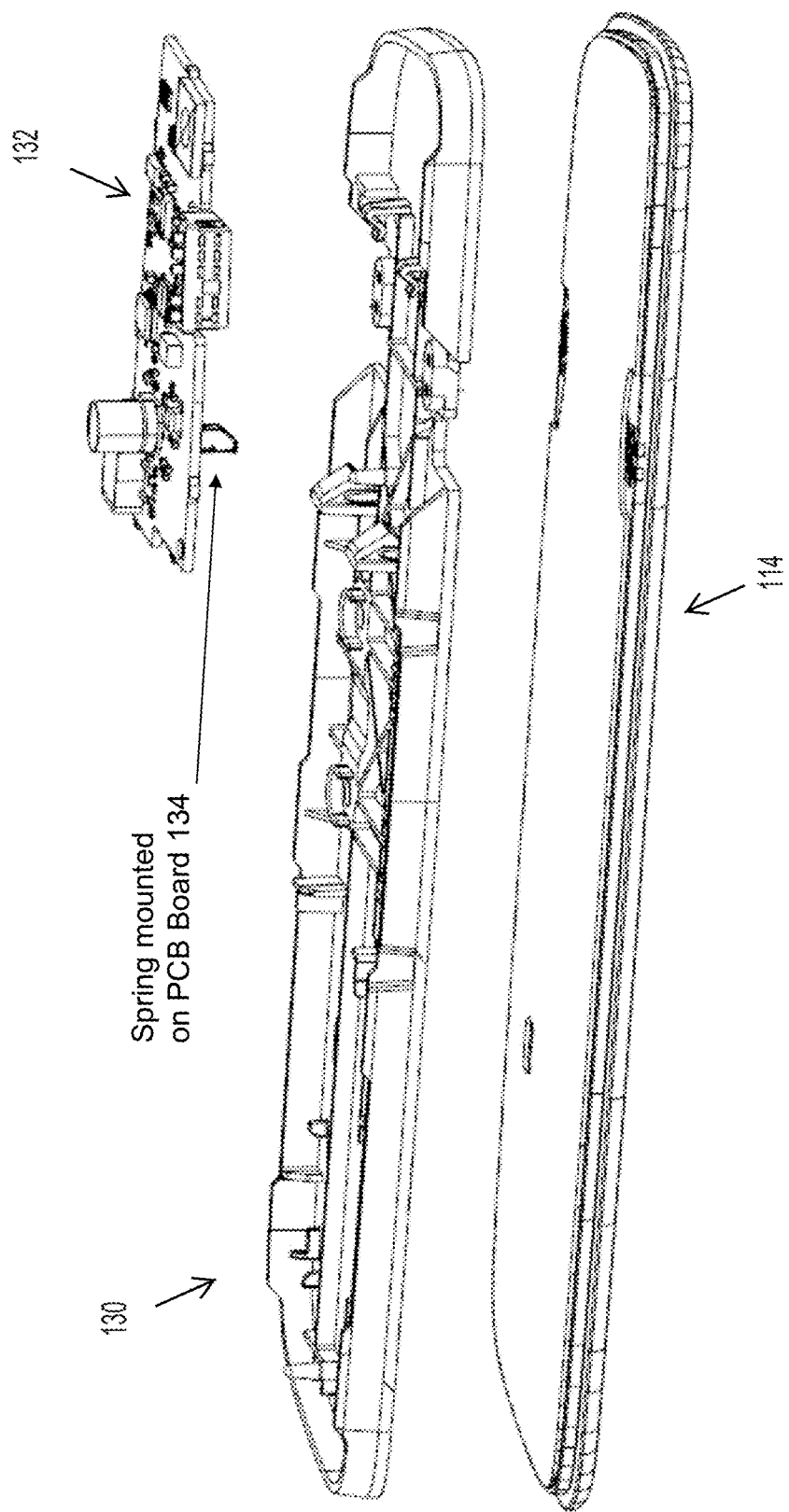
FIG. 5 is an exploded perspective view of another interior rearview mirror assembly, with a spring connector in accordance with the present invention.
Figure 6:
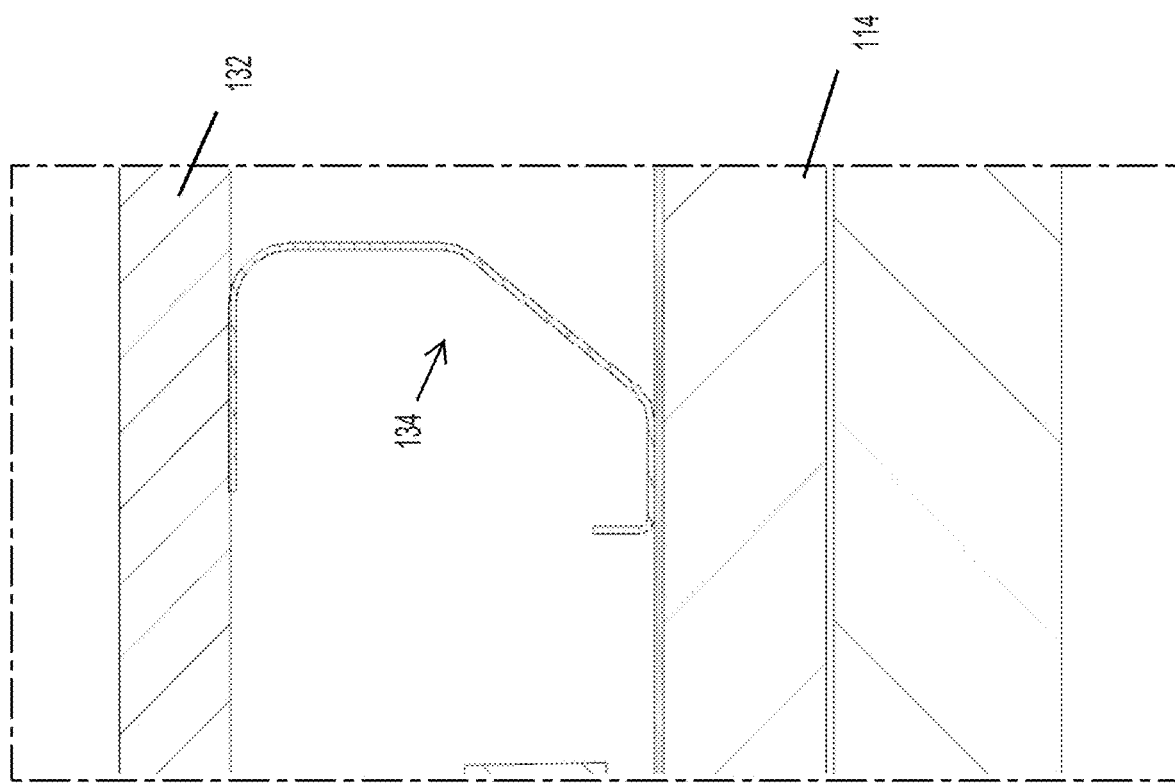
FIG. 6 is an enlarged view of the spring connector of FIG. 5.
Figure 7:
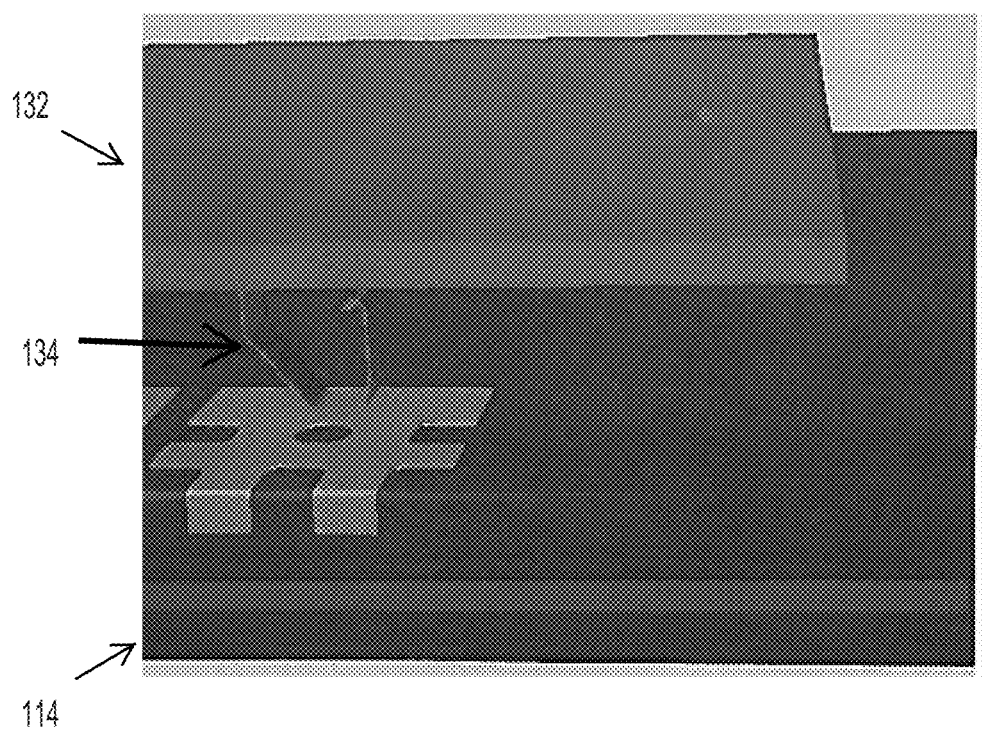
FIG. 7 is a perspective view of the spring connector, showing its connection to a metallic connector pad at the rear surface of the mirror reflective element.
Figure 8:
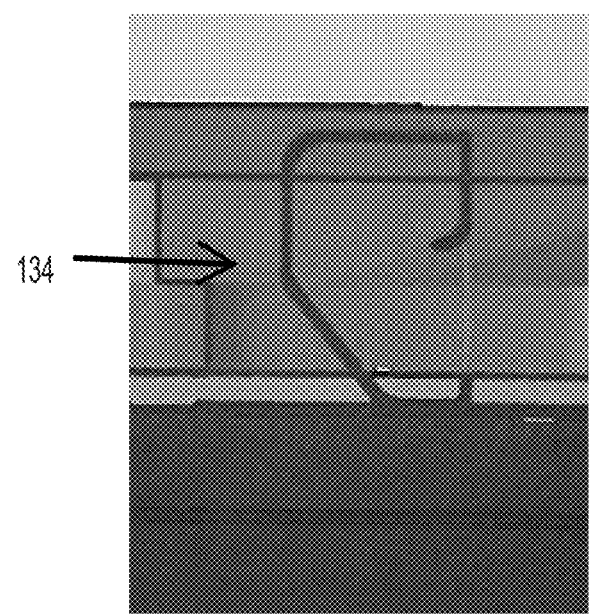
FIG. 8 is a side elevation of the connection of FIG. 7.

As can be seen with reference to FIGS. 3 and 4, the back plate 30 receives the reflective element 14 therein, with the electrically conductive pads 28b, 29a exposed at the rear surface of the reflective element. The back plate 30 includes apertures or passageways 30a therethrough that receive the connectors 34 (such as shown in FIG. 4). The back plate 30 (such as a generally planar portion 30c of the back plate 30) is attached at the rear surface of the reflective element, such as via an adhesive layer or element or tape 38 disposed between and attaching an attachment surface of the back plate 30 at the rear surface of the reflective element. The pads 28b, 29a are disposed at locations at the rear of the reflective element 14 where, when the back plate 30 is attached at the reflective element via the adhesive layer or element 38, the adhesive element 38 has corresponding openings or apertures and where the respective passageways 30a are located, such that the electrical connectors 34 electrically connect with the pads or elements 28b, 29a at the passageways 30a.

When the electrical connectors are received in the passageways 30a, the connectors 34 float or are movable along the passageway, with the movement limited by a flange or lip 30b of the back plate 30 and spaced apart flanges or lips 34a, 34b of the connector 34. The connectors 34 thus may be pressed into the passageways 30a (such as in an upward direction as shown in FIG. 4), whereby, after insertion, the connectors may move along the passageways but will not fall out of the passageways.

The connectors 34 have a length dimension (when not compressed) that is larger than the thickness of the back plate at the passageways, such that the contacts or ends 34c, 34d of the connectors may protrude from either side or both sides of the back plate. The metallic or electrically conductive contact end 34c is movable relative to the connector body and contact end 34d to compress or expand the connector, and is biased towards its extended state via an internal spring 34e. As shown in FIG. 4, the contact end 34d contacts the respective conductive pad or element 28b, 29a at the rear of the reflective element when the back plate is attached at the reflective element.

The circuit element 32 (such as a printed circuit board or PCB) is configured to snap attach at the back plate (such as via one or more clasps or tabs 30d that engage the circuit board substrate 32a, as shown in FIG. 4). When the circuit element 32 is attached at the back plate 30, respective circuitry (such as conductive traces of the PCB that are electrically connected to control circuitry, such as EC control circuitry, of the PCB) of the circuit element engages or electrically contacts the contact end 34c of the respective connector 34, whereby the connector compresses as it is sandwiched between the circuit board and the reflective element to establish electrical connection between both ends of the connector and the circuitry at the circuit element and the conductive pads at the rear of the reflective element, with the compressed spring biasing the contact ends towards the circuit element and the rear surface of the reflective element to maintain the electrical connection.

Thus, the spring-loaded electrical connector of the present invention may be formed of a first, generally tubular, metallic stamping or form or body portion having a first cross-sectional dimension, and a second, generally tubular, metallic stamping or form or body portion having a second cross-sectional dimension. The shape, form and cross-sectional dimension of the second body portion is smaller than that of the first body portion, such that the second body portion is disposed within the first body portion and is slidable along and within the first body portion. A spring or other biasing element is disposed within at least the first body portion and enables the second body portion to move within and along the inner walls of the first body portion. The spring element urges the second body portion outward from the first body portion to extend the connector to its extended state (where the length of the connector is greater than the thickness of the back plate in and through which it is disposed), with the spring element compressing to allow the connector to compress as the back plate is attached at the rear surface of the reflective element and as the circuit board or element is attached at the back plate.

The electrical connector and/or the back plate include retention tabs or flanges or elements to limit removal of the electrical connector from the back plate such that the back plate (with the electrical connectors disposed therein) can be moved and handled when it is not attached at the reflective element and/or circuit board, with the electrical connector remaining at the respective passageway of the back plate. The back plate (with the electrical connectors disposed therein) can be attached at the rear surface of the reflective element and then later the circuit board may be snap-attached at the back plate and reflective element construction to compress the electrical connectors and establish the electrical connection between the circuitry of the circuit board and the electrically conductive elements at the reflective element, or the circuit board can be attached to the back plate (with the electrical connectors disposed therein), whereby the back plate and circuit board can be later attached at the rear surface of the reflective element to compress the electrical connectors and establish the electrical connection between the circuitry of the circuit board and the electrically conductive elements at the reflective element. The spring-loaded electrical connector of the present invention thus provides enhanced assembly and electrical connection of mirror reflective element sub-assemblies.

Thus, the present invention provides spring-loaded electrical connectors that establish electrical connection between circuitry on a PCB and electrical contacts at the rear of the reflective element during assembly of the PCB to the back plate. The present invention thus reduces or eliminates wiring connectors and soldering of connectors at the reflective element. The spring force of the internal spring of the connector may be selected to be sufficient to establish and maintain electrical connection during and after assembly. For example, the spring force may be at least about 1 N, preferably at least about 1.5 N or thereabouts. The connector contact ends and body comprise a metallic or otherwise electrically conductive material and the spring also comprises a metallic or otherwise electrically conductive material such that electrical current can pass from one contact end to the other when one of the ends is electrically powered (and when the other end is electrically connected to circuitry to power).

In the illustrated embodiment, two electrical connectors are provided to establish electrical connection between EC control circuitry of the PCB to the electrically conductive coatings at the second and third surfaces of the reflective element. However, spring-loaded electrical connectors may also or otherwise provide electrical connection between circuitry of the PCB and contacts for other electrically powered or controlled elements, such as sensors or heater pads (for exterior mirror applications) or the like, while remaining within the spirit and scope of the present invention.

For example, one or more spring-loaded electrical connectors may be disposed in the back plate of an exterior rearview mirror assembly and configured to electrically connect with conductive pads or elements of a heater pad disposed at the rear of the mirror reflective element (and between a generally planar portion of the back plate and the mirror reflective element). The heater pad spring-loaded electrical connectors electrically connect to circuitry at the circuit board (such as when the circuit board is attached or snap-attached at the back plate) and provide power and/or control to the heater pad to control heating of the mirror reflective element of the exterior rearview mirror assembly. Optionally, other spring-loaded electrical connectors may be provided at and through the back plate for electrically connecting circuitry of the circuit board to other electrically powered elements or devices, such as one or more light sources or indicators disposed at the rear of the mirror reflective element (and viewable through the reflective element when powered). Thus, multiple spring-loaded electrical connectors of the present invention may be provided at and through the back plate to provide the desired electrical power and control of one or more electrically powered devices or element.

The present invention thus provides spring-loaded electrical connectors that electrically connect between the PCB and conductive coatings or pads at the rear of an electro-optic reflective element, with the connectors being snapped into the attachment plate or back plate with the ends protruding from one or both sides of the back plate. The pins or connectors are thus part of the back plate and are positioned at the rear of the reflective element when the reflective element is attached at or received in the back plate. Thus, when the reflective element is attached or received at the back plate, that end of the pin or connector may engage or may be pressed into engagement with the pads at the fourth surface and, when the PCB is snapped onto the back plate, the other end of the connector is pressed into engagement with circuitry of the PCB, thus connecting the PCB circuitry to the respective EC cell conductive coatings. The present invention thus provides enhanced assembly of the mirror reflective element assembly, particularly for frameless type mirror reflective elements that may not have an overlap or offset region of the substrates for a clip attachment. The conductive pads are established at the rear of the rear substrate and the spring-loaded or biased pins or connectors are disposed in the back plate and make connection between the conductive pads and circuitry or traces at the PCB when the PCB is attached at the back plate. The pins are then held in place by the attachment of the PCB and maintain the electrical connection of the circuitry to the conductive coatings of the reflective element. Such a configuration eases the assembly of the mirror and facilitates automated assembly and connections.

Optionally, the spring-loaded electrical connectors may be insert molded in the back plate (such as during an injection molding process that forms the plastic back plate), with the ends of the connector protruding at either side of the back plate. Optionally, the spring-loaded connector may be provided disposed in a plastic (non-electrically conductive) sleeve and may be longitudinally movable along a passageway of the sleeve (so as to generally float in the passageway of the sleeve), with one or more flanges of the connector and the sleeve interacting to limit longitudinal movement of the connector within and relative to the sleeve. The sleeves (with the respective spring-loaded connectors disposed therein) may be disposed in the mold for the back plate such that, when the back plate is molded (via an injection molding process), the sleeves are integral to the back plate and held in place by the molded back plate that is molded around the sleeves (which may have one or more exterior protrusions that are molded over by the back plate to further secure the sleeves relative to the molded back plate).

Optionally, the connectors may comprise a flexible spring metallic clip or connector (that is biased or spring-biased towards its initial shape or form) that flexes as the circuit board is moved towards the rear of the reflective element and as the connector engages a connector pad or element at the rear surface of the reflective element. For example, and with reference to FIGS. 5-8, a flexible spring clip or spring-biased connector 134 may be attached at the circuit board 132 (and electrically connected to circuitry of the circuit board) and may extend therefrom a selected distance such that, when the circuit board 132 is attached at the back plate 130 at the rear of the reflective element 114, the connector 134 engages an electrically conductive pad or element at the rear surface of the reflective element to electrically connect the circuitry of the circuit board to the electrically conductive coating or coatings of the reflective element. The connector 134 comprises a flexible metallic electrically conductive material and is sized so as to be larger than the gap between the circuit board and the conductive element at the rear surface of the reflective element when the circuit board is attached at the back plate of the mirror reflective element.

Thus, when the circuit board (with the connector attached thereto or integrally formed thereat) is pressed into a snap attachment with the back plate, the electrical connector 134 engages the conductive element at the rear surface of the reflective element and flexes. Because the connector preferably comprises a spring element, it is biased towards its initial state and thus exerts a contact force or pressure at the conductive element at the rear surface of the reflective element to maintain appropriate electrical contact between the circuitry of the circuit board and the conductive element at the rear surface of the reflective element.

The flexible spring clip connector 134 thus provides solderless electrical connection between circuitry of the circuit board and the conductive element at the rear surface of the reflective element. Optionally, the connector may be insert formed or clipped or connected at least partially in the circuit board substrate such that the connector is part of the circuit board and is received through an aperture in the back plate when the circuit board (with the connector attached thereto or integrally formed thereat) is pressed into a snap attachment with the back plate. Optionally, the connector may be insert molded in the back plate (such as during an injection molding process that forms the plastic back plate), with flexible or spring-biased portions of the connector protruding at either side of the back plate, whereby both portions flex as they engage with the circuit board and the conductive element at the rear surface of the reflective element, respectively, and are biased toward electrical contact with the circuit board and conductive element.

The present invention thus provides flexible or spring-biased or spring-loaded electrical connectors that electrically connect between the PCB and conductive coatings or pads at the rear of an electro-optic reflective element. The connectors may be part of the circuit board or part of the back plate and are positioned at the rear of the reflective element when the reflective element is attached at or received in the back plate. Thus, when the reflective element is attached or received at the back plate, that end of the connector may engage or may be pressed into engagement with the pads at the fourth surface and, when the PCB is snapped onto the back plate, the other end of the connector is pressed into engagement with circuitry of the PCB, thus connecting the PCB circuitry to the respective EC cell conductive coatings. The present invention thus provides enhanced assembly of the mirror reflective element assembly, particularly for frameless type mirror reflective elements that may not have an overlap or offset region of the substrates for a clip attachment. The connectors are held in place by the attachment of the PCB and maintain the electrical connection of the circuitry to the conductive coatings of the reflective element. Such a configuration eases the assembly of the mirror and facilitates automated assembly and connections.

Figure 9:
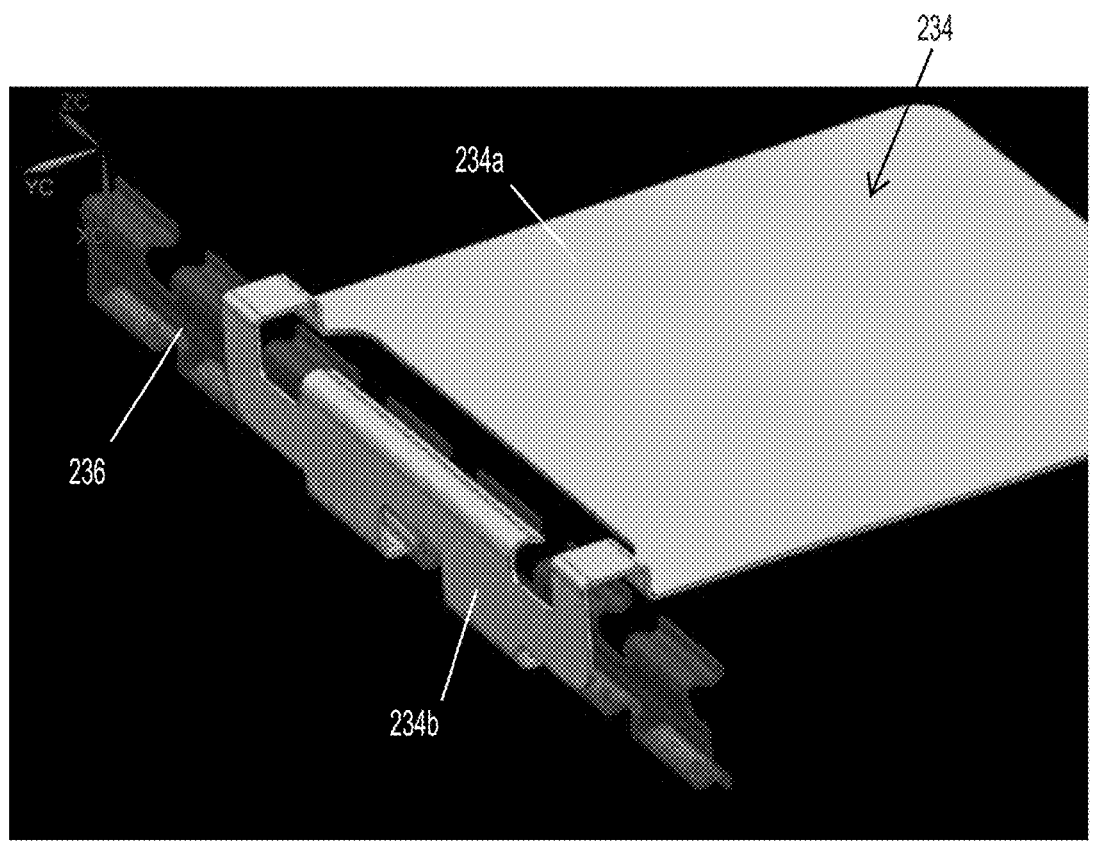
FIG. 9 is a perspective view of a connector pad configured to clip onto a conventional electrode clip attached along an edge of a substrate of a mirror reflective element in accordance with the present invention.
Figure 10:
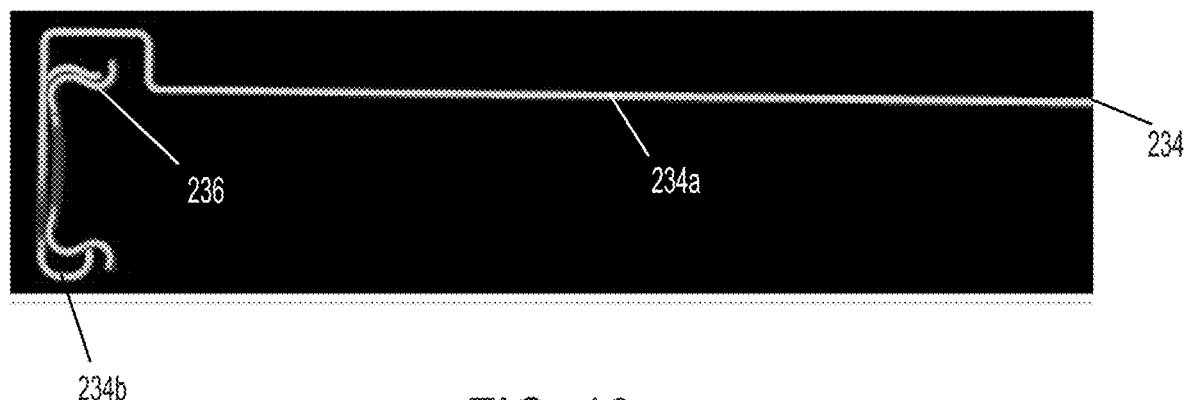
FIG. 10 is a side view and partial sectional view of the connector pad and conventional electrode clip of FIG. 9.

Optionally, the electrical connection of the present invention may be made to conventional electrode clips attached at a perimeter edge region of a glass substrate of the mirror reflective element (whereby the electrode clip makes electrical contact with a conductive coating on one of the surfaces of the substrate, such as with a conductive coating at the front or third surface of the rear substrate or with a transparent conductive coating at the rear or second surface of the front substrate). For example, and such as shown in FIGS. 9 and 10, a connector pad 234 has a pad portion 234*a* that may attach at the back plate and includes an extension or clip portion 234*b* configured to extend over and snap to an electrode clip 236 already attached at the perimeter edge of the rear substrate) when the back plate (and connector pad) is attached at the rear surface of the rear substrate of the mirror reflective element. In a similar manner, another connector pad may have an extension or clip portion that extends further from the pad portion to snap attach and electrically connect to an electrode clip at a perimeter edge of the front substrate. For example, a connector pad for the rear substrate electrode clip may have its clip portion along one perimeter region of the rear substrate (such as along an upper or lower region) and the other connector pad (for the front substrate electrode clip) may have its clip portion along an opposite perimeter region (such as along the lower or upper region). The extension or clip portions of the connector pads of the present invention thus may snap attach at the respective electrode clip as the back plate is attached, thus easing the assembly process and electrical connection of electro-optic control circuitry to the conductive coatings at the surfaces of the mirror reflective element substrates that oppose and contact the electro-optic medium. The spring-loaded or spring-biased electrical connectors of the present invention may then electrically connect to the connector pads when the back plate is attached at the reflective element and/or when the circuit board is attached at the back plate, such as in a similar manner as discussed above.

The mirror casing may include a bezel portion that circumscribes a perimeter region of the front surface of the reflective element, or the perimeter region of the front surface of the reflective element may be exposed (such as by utilizing aspects of the mirror reflective elements described in International Publication Nos. WO 2010/124064; WO 2011/044312; WO 2012/051500; WO 2013/071070 and/or WO 2013/126719, which are hereby incorporated herein by reference in their entireties).

The back plate may comprise any suitable construction. Optionally, for example, a common or universal back plate, whereby the appropriate or selected socket element or pivot element (such as a socket element or such as a ball element or the like) is attached to the back plate to provide the desired pivot joint for the particular mirror head in which the back plate is incorporated. Optionally, when molding the back plate, a different insert may be provided to integrally mold a portion of or all of a ball member or the like (such as a portion of a base of a ball member, whereby the ball member may comprise a metallic ball member that is insert molded at the base and at the rear of the back plate during the injection molding process that forms the back plate, such as by utilizing aspects of the mirror assemblies described in U.S. Pat. Nos. 7,855,755; 7,249,860 and 6,329,925 and/or U.S. Pat. Pub. Nos. US-2013-0088884 and/or US-2006-0061008, which are hereby incorporated herein by reference in their entireties).

The reflective element and mirror casing are adjustable relative to a base portion or mounting assembly to adjust the driver's rearward field of view when the mirror assembly is normally mounted at or in the vehicle. The mounting assembly may comprise a single-ball or single-pivot mounting assembly, whereby the reflective element and casing are adjustable relative to the vehicle windshield (or other interior portion of the vehicle) about a single pivot joint, or the mounting assembly may comprise other types of mounting configurations, such as a double-ball or double-pivot mounting configuration or the like, while remaining within the spirit and scope of the present invention. The socket or pivot element is configured to receive a ball member of the base portion, such as for a single pivot or single ball mounting structure or a double pivot or double ball mounting structure or the like (such as a pivot mounting assembly of the types described in U.S. Pat. Nos. 6,318,870; 6,593,565; 6,690,268; 6,540,193; 4,936,533; 5,820,097; 5,100,095; 7,249,860; 6,877,709; 6,329,925; 7,289,037; 7,249,860 and/or 6,483,438, which are hereby incorporated herein by reference in their entireties).

The mounting base includes an attaching portion that is configured to be attached to an interior surface of a vehicle windshield (such as to a mounting button or attachment element adhered to the interior surface of the vehicle windshield or such as to a headliner or overhead console of the vehicle). The mounting base may comprise a metallic ball portion or may comprise a molded (such as injection molded) polymeric mounting base or may be otherwise formed, depending on the particular application of the mirror assembly.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Des. Pat. Nos. D633,423; D633,019; D638,761 and/or D647,017, and/or International Publication Nos. WO 2010/124064; WO 2011/044312; WO 2012/051500; WO 2013/071070 and/or WO 2013/126719, which are hereby incorporated herein by reference in their entireties (and with electrochromic and prismatic mirrors of such construction are commercially available from the assignee of this application under the trade name INFINITY™ mirror).

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

Although shown as an electrochromic mirror application, it is envisioned that the mirror assembly may comprise a prismatic reflective element, while remaining within the spirit and scope of the present invention. The prismatic mirror assembly may be mounted or attached at an interior portion of a vehicle (such as at an interior surface of a vehicle windshield) via the mounting means described above, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, which are hereby incorporated herein by reference in their entireties. Optionally, for example, the interior rearview mirror assembly may comprise a prismatic mirror assembly, such as the types described in U.S. Pat. Nos. 7,289,037; 7,249,860; 6,318,870; 6,598,980; 5,327,288; 4,948,242; 4,826,289; 4,436,371 and/or 4,435,042, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,289,037; 7,274,501; 7,249,860; 7,338,177 and/or 7,255,451, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319 and/or 6,315,421 (which are hereby incorporated herein by reference in their entireties), that can benefit from the present invention.

Optionally, the reflective element may include an opaque or substantially opaque or hiding perimeter layer or coating or band disposed around a perimeter edge region of the front substrate (such as at a perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190 and/or 7,255,451, and/or International Publication Nos. WO 2010/124064 and/or WO 2011/044312, which are all hereby incorporated herein by reference in their entireties. Optionally, the perimeter band may comprise a chrome/chromium coating or metallic coating and/or may comprise a chrome/chromium or metallic coating that has a reduced reflectance, such as by using an oxidized chrome coating or chromium oxide coating or "black chrome" coating or the like (such as by utilizing aspects of the mirror assemblies described in U.S. Pat. No. 7,184,190 and/or 7,255,451, which are hereby incorporated herein by reference in their entireties). Optionally, other opaque or substantially opaque coatings or bands may be implemented while remaining within the spirit and scope of the present invention.

Optionally, the interior rearview mirror assembly may include circuitry therein (such as at a printed circuit board or the like disposed within the mirror casing, and electrical connection to the circuitry may be made via an electrical lead or connector of a wiring harness of the vehicle. Optionally, the electrical connector may be received through the mirror casing and through an aperture established through the toggle element, such as by utilizing aspects of the mirror assemblies described in U.S. Pat. No. 5,798,688 and/or U.S. Publication No. US-2010-0085653, which are hereby incorporated herein by reference in their entireties.

The mirror assembly may include user actuatable inputs operable to control any of the accessories of or associated with the mirror assembly and/or an accessory module or the like. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or International Publication Nos. WO 2012/051500 and/or WO 2013/071070, which are hereby incorporated herein by reference in their entireties, or such as proximity sensors of the types described in U.S. Pat. Nos. 7,224,324; 7,249,860 and/or 7,446,924, and/or International Publication No. WO 2004/058540, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258 and/or 6,369,804, which are hereby incorporated herein by reference in their entireties, and/or the like, while remaining within the spirit and scope of the present invention.

Optionally, the user inputs or buttons may comprise user inputs for a garage door opening system, such as a vehicle based garage door opening system of the types described in U.S. Pat. Nos. 6,396,408; 6,362,771; 7,023,322 and/or 5,798,688, which are hereby incorporated herein by reference in their entireties. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,477,464; 6,946,978; 7,308,341; 7,167,796; 7,004,593; 7,657,052 and/or 6,678,614, and/or U.S. Pat. Pub. No. US-2006-0050018, which are all hereby incorporated herein by reference in their entireties.

Optionally, the mirror assembly may include one or more other displays, such as the types disclosed in U.S. Pat. Nos. 5,530,240 and/or 6,329,925, which are hereby incorporated herein by reference in their entireties, and/or display-on-demand transflective type displays, and/or video displays or display screens, such as the types disclosed in U.S. Pat. Nos. 8,890,955; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. Pat. Pub. Nos. US-2006-0050018; US-2009-0015736; US-2009-0015736 and/or US-2010-0097469, which are all hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775 and/or 7,249,860, microphones, such as disclosed in U.S. Pat. Nos. 7,657,052; 6,243,003; 6,278,377 and/or 6,420,975, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 7,720,580; 7,038,577; 6,882,287; 5,929,786 and/or 5,786,772, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,400,435; 7,526,103; 6,690,268 and/or 6,847,487, and/or U.S. Pat. Pub. No. US-2006-0125919, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522, and/or an ONSTAR® system, a compass, such as disclosed in U.S. Pat. Nos. 5,924,212; 4,862,594; 4,937,945; 5,131,154; 5,255,442 and/or 5,632,092, and/or any other accessory or circuitry or the like (with all of the above-referenced patents and publications being commonly assigned and being hereby incorporated herein by reference in their entireties).

The mirror assembly may comprise or utilize aspects of other types of casings or the like, such as described in U.S. Pat. Nos. 7,338,177; 7,289,037; 7,249,860; 6,439,755;

4,826,289 and/or 6,501,387, which are all hereby incorporated herein by reference in their entireties, without affecting the scope of the present invention. For example, the mirror assembly may utilize aspects of the flush or frameless or bezelless reflective elements described in U.S. Pat. Nos. 7,626,749; 7,360,932; 7,289,037; 7,255,451; 7,274,501 and/or 7,184,190, which are all hereby incorporated herein by reference in their entireties.

Optionally, the mirror assembly may comprise a modular mirror construction, and may include back housing portions or the like, such as cap portions of the types described in U.S. Pat. No. 7,289,037, which is hereby incorporated herein by reference in its entirety. A display screen may be provided as a modular display screen and may be mountable or installable in the appropriate or suitable mirror casing to provide a modular mirror assembly and display screen. For example, a rear casing or cap portion may include the display screen module including the associated components, such as the rails and motor and the like for a video slideout module (such as by utilizing aspects of the video mirrors described in U.S. Pat. Nos. 7,370,983 and 6,690,268, and/or U.S. Pat. Pub. Nos. US-2006-0050018 and/or US-2009-0015736, which are hereby incorporated herein by reference in their entireties), and may be attachable to a reflective element and/or mirror casing to assemble the modular mirror assembly. The display screen module thus may be provided as an optional component or accessory for a vehicle, and may be readily assembled to a common reflective element and/or mirror casing of the mirror assembly.

Optionally, the mirror casing and/or reflective element may include customized or personalized viewable characteristics, such as color or symbols or indicia selected by the vehicle manufacturer or owner of the vehicle, such as the customization characteristics described in U.S. Pat. Nos. 7,626,749; 7,255,451 and/or 7,289,037, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular rearview mirror assembly, said vehicular rearview mirror assembly comprising:

an electro-optic reflective element having a front substrate and a rear substrate and an electro-optic medium sandwiched therebetween, said front substrate having a first surface and a second surface with a transparent electrically conductive coating at the second surface and in contact with said electro-optic medium, said rear substrate having a third surface and a fourth surface with an electrically conductive coating at the third surface and in contact with said electro-optic medium;

an electrically conductive element established at the fourth surface of said rear substrate and in electrical connection to one of said transparent electrically conductive coating at the second surface of said front substrate or said electrically conductive coating at the third surface of said rear substrate;

a back plate attached at said electro-optic reflective element, said back plate having a passageway established through said back plate, wherein said back plate comprises a polymeric back plate formed via an injection molding process;

a circuit element disposed at a rear side of said back plate, said circuit element having an electrically conductive trace in electrical connection with electro-optic control circuitry;

a spring-loaded electrical connector disposed in the passageway of said back plate, wherein said spring-loaded electrical connector comprises an outer electrically conductive part and an inner electrically conductive part movably disposed partially within the outer electrically conductive part and in electrical conductivity with the outer electrically conductive part, and wherein said spring-loaded electrical connector is spring-biased toward an extended state and compressible toward a compressed state, and wherein, with said spring-loaded electrical connector in its extended state, a length dimension of said spring-loaded electrical connector is greater than a thickness of said back plate at the passageway;

wherein the outer electrically conductive part of said spring-loaded electrical connector is movable within and partially along the passageway; and wherein, with said circuit element attached at said back plate attached at said electro-optic reflective element, said spring-loaded electrical connector is compressed toward the compressed state and electrically connects the electrically conductive trace and the electrically conductive element.

2. The vehicular rearview mirror assembly of claim 1, wherein movement of the outer electrically conductive part of said spring-loaded electrical connector is limited by a flange of said back plate that protrudes partially into the passageway.

3. The vehicular rearview mirror assembly of claim 2, wherein said spring-loaded electrical connector is disposed in the passageway and the outer electrically conductive part is retained therein via the flange of said back plate in the passageway being disposed between spaced apart flanges of the outer electrically conductive part of said spring-loaded electrical connector.

4. The vehicular rearview mirror assembly of claim 3, wherein one of the spaced apart flanges of the outer electrically conductive part allows for insertion of said spring-loaded electrical connector into the passageway from one direction to dispose said spring-loaded electrical connector in the passageway, and wherein the one of the spaced apart flanges of the outer electrically conductive part limits movement in the other direction of the outer electrically conductive part of said spring-loaded electrical connector when said spring-loaded electrical connector is inserted into the passageway.

5. The vehicular rearview mirror assembly of claim 3, wherein movement of the outer electrically conductive part of said spring-loaded electrical connector is limited by one of the spaced apart flanges of the outer electrically conductive part engaging the flange of said back plate.

6. The vehicular rearview mirror assembly of claim 1, wherein said spring-loaded electrical connector is insert molded in the passageway of said back plate during the injection molding process that forms said back plate.

7. The vehicular rearview mirror assembly of claim 1, wherein said circuit element comprises a printed circuit board.

8. The vehicular rearview mirror assembly of claim 7, wherein said printed circuit board is snap-attached at said back plate.

9. The vehicular rearview mirror assembly of claim 7, wherein the electro-optic control circuitry is established at said printed circuit board.

10. The vehicular rearview mirror assembly of claim 7, wherein said spring-loaded electrical connector contacts and is biased into engagement with the electrically conductive element and the electrically conductive trace to electrically connect the electrically conductive trace and the electrically conductive element when said printed circuit board is attached at said back plate.

11. The vehicular rearview mirror assembly of claim 1, wherein one of the electrically conductive inner part or the electrically conductive outer part comprises a reflective element contacting end that, when said spring-loaded electrical connector is disposed in the passageway, contacts the electrically conductive element at the fourth surface of said rear substrate, and wherein the other of the electrically conductive inner part or the electrically conductive outer part comprises a circuitry contacting end that, when said spring-loaded electrical connector is disposed in the passageway, contacts the electrically conductive trace at said circuit element.

12. The vehicular rearview mirror assembly of claim 11, wherein said spring-loaded electrical connector comprises a spring element disposed at least partially in the electrically conductive inner part and the electrically conductive outer part, and wherein the spring element urges the electrically conductive inner part outward from the electrically conductive outer part.

13. The vehicular rearview mirror assembly of claim 12, wherein the spring element comprises an electrically conductive spring element.

14. The vehicular rearview mirror assembly of claim 12, wherein the spring element has a spring force of at least 1 Newton.

15. The vehicular rearview mirror assembly of claim 1, wherein said vehicular rearview mirror assembly comprises an interior rearview mirror assembly and is configured for mounting at an interior portion of a vehicle.

16. The vehicular rearview mirror assembly of claim 1, wherein said vehicular rearview mirror assembly comprises an exterior rearview mirror assembly and is configured for mounting at an exterior portion of a vehicle.

17. A vehicular rearview mirror assembly, said vehicular rearview mirror assembly comprising:
    an electro-optic reflective element having a front substrate and a rear substrate and an electro-optic medium sandwiched therebetween, said front substrate having a first surface and a second surface with a transparent electrically conductive coating at the second surface and in contact with said electro-optic medium, said rear substrate having a third surface and a fourth surface with an electrically conductive coating at the third surface and in contact with said electro-optic medium;
    an electrically conductive element established at the fourth surface of said rear substrate and in electrical connection to one of said transparent electrically conductive coating at the second surface of said front substrate or said electrically conductive coating at the third surface of said rear substrate;
    a back plate attached at said electro-optic reflective element, said back plate having a passageway established through said back plate, wherein said back plate comprises a polymeric back plate formed via an injection molding process;
    a circuit element disposed at a rear side of said back plate, said circuit element having an electrically conductive trace in electrical connection with electro-optic control circuitry;
    a spring-loaded electrical connector disposed in the passageway of said back plate, wherein said spring-loaded electrical connector comprises an outer electrically conductive part and an inner electrically conductive part movably disposed partially within the outer electrically conductive part and in electrical conductivity with the outer electrically conductive part, and wherein said spring-loaded electrical connector is spring-biased toward an extended state and compressible toward a compressed state, and wherein, with said spring-loaded electrical connector in its extended state, a length dimension of said spring-loaded electrical connector is greater than a thickness of said back plate at the passageway;
    wherein said spring-loaded electrical connector comprises a spring element disposed at least partially in the electrically conductive inner part and the electrically conductive outer part, and wherein the spring element urges the electrically conductive inner part outward from the electrically conductive outer part;
    wherein the spring element has a spring force of at least 1 Newton;
    wherein the outer electrically conductive part of said spring-loaded electrical connector is movable within and partially along the passageway;
    wherein, with said circuit element attached at said back plate attached at said electro-optic reflective element, said spring-loaded electrical connector is compressed toward the compressed state and electrically connects the electrically conductive trace and the electrically conductive element; and
    wherein said vehicular rearview mirror assembly comprises an interior rearview mirror assembly and is configured for mounting at an interior portion of a vehicle.

18. The vehicular rearview mirror assembly of claim 17, wherein movement of the outer electrically conductive part of said spring-loaded electrical connector is limited by a flange of said back plate that protrudes partially into the passageway.

19. The vehicular rearview mirror assembly of claim 17, wherein said circuit element comprises a printed circuit board.

20. The vehicular rearview mirror assembly of claim 19, wherein said printed circuit board is snap-attached at said back plate.

21. The vehicular rearview mirror assembly of claim 19, wherein the electro-optic control circuitry is established at said printed circuit board.

22. The vehicular rearview mirror assembly of claim 19, wherein said spring-loaded electrical connector contacts and is biased into engagement with the electrically conductive element and the electrically conductive trace to electrically connect the electrically conductive trace and the electrically conductive element when said printed circuit board is attached at said back plate.

23. The vehicular rearview mirror assembly of claim 17, wherein the spring element comprises an electrically conductive spring element.

24. The vehicular rearview mirror assembly of claim 17, wherein said spring-loaded electrical connector is insert molded in the passageway of said back plate during the injection molding process that forms said back plate.

25. A vehicular rearview mirror assembly, said vehicular rearview mirror assembly comprising:
- an electro-optic reflective element having a front substrate and a rear substrate and an electro-optic medium sandwiched therebetween, said front substrate having a first surface and a second surface with a transparent electrically conductive coating at the second surface and in contact with said electro-optic medium, said rear substrate having a third surface and a fourth surface with an electrically conductive coating at the third surface and in contact with said electro-optic medium;
- a first electrically conductive element established at the fourth surface of said rear substrate and in electrical connection to said transparent electrically conductive coating at the second surface of said front substrate;
- a second electrically conductive element established at the fourth surface of said rear substrate and in electrical connection to said electrically conductive coating at the third surface of said rear substrate;
- a back plate attached at said electro-optic reflective element, said back plate having first and second passageways established through said back plate, wherein said back plate comprises a polymeric back plate formed via an injection molding process;
- a circuit element disposed at a rear side of said back plate, said circuit element having first and second electrically conductive traces in electrical connection with electro-optic control circuitry;
- a first spring-loaded electrical connector disposed in the first passageway of said back plate, wherein said first spring-loaded electrical connector comprises a first outer electrically conductive part and a first inner electrically conductive part movably disposed partially within the first outer electrically conductive part and in electrical conductivity with the first outer electrically conductive part, and wherein said first spring-loaded electrical connector is spring-biased toward an extended state and compressible toward a compressed state, and wherein, with said first spring-loaded electrical connector in its extended state, a length dimension of said first spring-loaded electrical connector is greater than a thickness of said back plate at the first passageway;
- a second spring-loaded electrical connector disposed in the second passageway of said back plate, wherein said second spring-loaded electrical connector comprises a second outer electrically conductive part and a second inner electrically conductive part movably disposed partially within the second outer electrically conductive part and in electrical conductivity with the second outer electrically conductive part, and wherein said second spring-loaded electrical connector is spring-biased toward an extended state and compressible toward a compressed state, and wherein, with said second spring-loaded electrical connector in its extended state, a length dimension of said second spring-loaded electrical connector is greater than a thickness of said back plate at the second passageway;
- wherein the first outer electrically conductive part of said first spring-loaded electrical connector is movable within and partially along the first passageway, and wherein the second outer electrically conductive part of said second spring-loaded electrical connector is movable within and partially along the second passageway; and
- wherein, with said circuit element attached at said back plate attached at said electro-optic reflective element, (i) said first spring-loaded electrical connector is compressed toward its compressed state and electrically connects said first electrically conductive trace and said first electrically conductive element and (ii) said second spring-loaded electrical connector is compressed toward its compressed state and electrically connects said second electrically conductive trace and said second electrically conductive element.

26. The vehicular rearview mirror assembly of claim 25, wherein movement of the first outer electrically conductive part of said first spring-loaded electrical connector is limited by a first flange of said back plate that protrudes partially into the first passageway, and wherein movement of the second outer electrically conductive part of said second spring-loaded electrical connector is limited by a second flange of said back plate that protrudes partially into the second passageway.

27. The vehicular rearview mirror assembly of claim 25, wherein said circuit element comprises a printed circuit board.

28. The vehicular rearview mirror assembly of claim 27, wherein said printed circuit board is snap-attached at said back plate.

29. The vehicular rearview mirror assembly of claim 27, wherein the electro-optic control circuitry is established at said printed circuit board.

30. The vehicular rearview mirror assembly of claim 25, wherein said first spring-loaded electrical connector is insert molded in the first passageway of said back plate during the injection molding process that forms said back plate, and wherein said second spring-loaded electrical connector is insert molded in the second passageway of said back plate during the injection molding process that forms said back plate.

* * * * *